United States Patent
Zhang et al.

(10) Patent No.: US 10,856,223 B2
(45) Date of Patent: Dec. 1, 2020

(54) METHOD OF, AND TRANSCEIVER STATION AND MOBILE TERMINAL FOR, DISTRIBUTING SYSTEM INFORMATION IN A CELLULAR TELECOMMUNICATIONS NETWORK

(71) Applicant: Nederlandse Organisatie voor toegepast-natuurwetenschappelijk onderzoek TNO, The Hague (NL)

(72) Inventors: Haibin Zhang, The Hague (NL); Jorguseski Ljupco, The Hague (NL); Oliver Blume, Stuttgart (DE)

(73) Assignee: NEDERLANDSE ORGANISATIE VOOR TOEGEPAST-NATUURWETENSCHAPPELIJK ONDERZOEK TNO, The Hague (NL)

( * ) Notice: Subject to any disclaimer, the term of this patent is extended or adjusted under 35 U.S.C. 154(b) by 0 days.

(21) Appl. No.: 15/324,915

(22) PCT Filed: Jul. 9, 2015

(86) PCT No.: PCT/NL2015/050502
§ 371 (c)(1),
(2) Date: Jan. 9, 2017

(87) PCT Pub. No.: WO2016/007007
PCT Pub. Date: Jan. 14, 2016

(65) Prior Publication Data
US 2017/0208543 A1    Jul. 20, 2017

(30) Foreign Application Priority Data
Jul. 9, 2014   (EP) ..................... 14176373

(51) Int. Cl.
*H04W 52/02* (2009.01)
*H04L 5/00* (2006.01)
(Continued)

(52) U.S. Cl.
CPC ....... *H04W 52/0206* (2013.01); *H04L 5/0032* (2013.01); *H04W 36/0072* (2013.01);
(Continued)

(58) Field of Classification Search
CPC ... H04L 5/0032; H04L 5/0053; H04L 5/0073; H04W 36/0072; H04W 48/08;
(Continued)

(56) References Cited

U.S. PATENT DOCUMENTS 7,054,619 B2 * 5/2006 Kettunen ............ H04W 48/16
455/414.2
8,554,236 B2 * 10/2013 Choi .................... H04W 48/12
370/280
(Continued)

FOREIGN PATENT DOCUMENTS

CN    107277920 A  * 10/2017  ........... H04W 72/04
GB    2316578 A    *  2/1998  ........... H04W 16/06
(Continued)

OTHER PUBLICATIONS

International Search Report and Written Opinion dated Sep. 22, 2015 for application PCT/NL2015/050502, filed on Jul. 9, 2015, and published as WO/2016/007007 on Jan. 14, 2016 (Applicant— Nederlandse Organisatie voor toegepastnatuurwetenschappelijk onderzoek TNO // Inventor—Zhang, et al.) (8 pages).
(Continued)

*Primary Examiner* — Eric Nowlin
(74) *Attorney, Agent, or Firm* — Ballard Spahr LLP

(57) ABSTRACT

The invention is directed at a method of distributing system information to one or more mobile terminals in a cellular telecommunications network. The network comprises at least one signaling cell serving a first coverage area, and one or more data cells associated with said signaling cell, each one of said data cells serving a respective partial coverage
(Continued)

area covering at least a part of the first coverage area. For each one of said data cells, the respective data cell is operated in either an active or inactive communication mode depending on whether there is at least one of said mobile terminals present in the partial coverage area of said respective data cell, and whether said at least one mobile terminal operates in an active terminal mode and is not served by other data cells.

18 Claims, 8 Drawing Sheets

(51) Int. Cl.
*H04W 36/00* (2009.01)
*H04W 48/08* (2009.01)
*H04W 48/12* (2009.01)

(52) U.S. Cl.
CPC ........... *H04W 48/08* (2013.01); *H04W 48/12* (2013.01); *Y02D 30/70* (2020.08)

(58) Field of Classification Search
CPC ............. H04W 48/12; H04W 52/0206; H04W 72/042; H04W 72/0446; H04W 84/045
See application file for complete search history.

(56) References Cited

U.S. PATENT DOCUMENTS

| | | | | |
|---|---|---|---|---|
| 8,755,802 | B1* | 6/2014 | Butala | H04W 36/0005 |
| | | | | 455/436 |
| 9,456,415 | B2* | 9/2016 | Peng | H04W 52/04 |
| 9,462,499 | B2* | 10/2016 | Shen | H04W 24/10 |
| 9,913,265 | B2* | 3/2018 | Guan | H04W 72/042 |
| 2008/0311922 | A1* | 12/2008 | Choi | H04W 48/12 |
| | | | | 455/450 |
| 2013/0083744 | A1* | 4/2013 | Peng | H04W 52/04 |
| | | | | 370/329 |
| 2014/0170965 | A1* | 6/2014 | Li | H04W 28/08 |
| | | | | 455/7 |
| 2014/0179323 | A1* | 6/2014 | Butala | H04W 48/12 |
| | | | | 455/437 |
| 2014/0364120 | A1* | 12/2014 | Butala | H04W 48/12 |
| | | | | 455/436 |
| 2015/0063136 | A1* | 3/2015 | Shen | H04W 24/10 |
| | | | | 370/252 |
| 2015/0173089 | A1* | 6/2015 | Baghel | H04W 4/90 |
| | | | | 370/329 |
| 2015/0181575 | A1* | 6/2015 | Ng | H04L 5/0092 |
| | | | | 370/329 |
| 2015/0237545 | A1* | 8/2015 | Takano | H04W 36/0072 |
| | | | | 370/331 |
| 2015/0365849 | A1* | 12/2015 | Gao | H04W 36/0083 |
| | | | | 455/436 |
| 2018/0007563 | A1* | 1/2018 | Zhang | H04W 16/32 |
| 2018/0115443 | A1* | 4/2018 | Mauritz | H04L 25/03866 |

FOREIGN PATENT DOCUMENTS

| | | | | |
|---|---|---|---|---|
| GB | 2316578 B | * | 1/2001 | ............ H04W 16/06 |
| WO | WO-2009/076997 A1 | | 6/2009 | |
| WO | WO-2010/019524 A2 | | 2/2010 | |
| WO | WO-2010093298 A1 | * | 8/2010 | ........ H04W 52/0206 |
| WO | WO-2010/123793 A1 | | 10/2010 | |
| WO | WO-2010093298 A8 | * | 10/2010 | ........ H04W 52/0206 |
| WO | WO-2011047566 A1 | * | 4/2011 | ............ H04W 48/16 |
| WO | WO-2012146295 A1 | * | 11/2012 | ............ H04W 28/08 |
| WO | WO-2013/068362 A1 | | 5/2013 | |
| WO | WO-2013/068364 A1 | | 5/2013 | |
| WO | WO-2013/068368 A1 | | 5/2013 | |
| WO | WO-2013/068369 A1 | | 5/2013 | |
| WO | WO-2015066645 A1 | * | 5/2015 | ............ H04W 48/16 |
| WO | PCT/NL2015/050502 | | 7/2015 | |
| WO | WO-2017174008 A1 | * | 10/2017 | ............ H04W 72/04 |

OTHER PUBLICATIONS

Capone, et al., "Rethinking cellular system architecture for breaking current energy efficiency limits",Sustainable Internet and ICT for Sustainability (Sustainit), IEEE,Oct. 4, 2012, pp. 1-5.

Xu, et al., "On functionality separation for green mobile networks: concept study over LTE",IEEE Communications Magazine, IEEE Service Center, Piscataway, US, vol. 51, No. 5, May 1, 2013, pp. 82-90.

ETSI TS 136 331 V11.7.0 (Mar. 2014) LTE; Evolved Universal Terrestrial Radio Access (E-UTRA); Radio Resource Control (RRC); Protocol specification (3GPP TS 36.331 version 11.7.0 Release 11) (2014) (354 page).

LTE: The UMTS Long Term Evolution, From Theory to Practice, edited by Stefania Seaia, et al., Second Edition Wiley Publishing (2011) (794 pages).

* cited by examiner

METHOD OF, AND TRANSCEIVER STATION AND MOBILE TERMINAL FOR, DISTRIBUTING SYSTEM INFORMATION IN A CELLULAR TELECOMMUNICATIONS NETWORK

CROSS REFERENCE TO RELATED APPLICATIONS

This application is a national phase filing of International Patent Application No. PCT/NL2015/050502, filed Jul. 9, 2015, which claims priority to European Application No. 14176373.0 filed Jul. 9, 2014, both of which are herein incorporated by reference in their entireties.

FIELD OF THE INVENTION

The present invention is directed at a method of distributing system information to one or more mobile terminals in a cellular telecommunications network, the network comprising at least one signaling cell serving a first coverage area, and one or more data cells associated with said signaling cell, each one of said data cells serving a respective partial coverage area covering at least a part of the first coverage area; wherein, for each one of said data cells, said respective data cell is operated in either an active or inactive communication mode depending on whether there is at least one of said mobile terminals present in the partial coverage area of said respective data cell, and whether said at least one mobile terminal operates in an active terminal mode. The invention is further directed at a transceiver station, a mobile terminal, and a computer program product.

BACKGROUND

The present document relates to energy efficient cellular wireless networks, sometimes referred to as beyond cellular green generation (BCG2) networks. By separating the signaling from the data transmission, such network designs intend to overcome the shortcomings of traditional cellular networks. The signaling network consists of (large area) signaling cells (S-cells) that support idle mode mobile terminals (i.e. user equipment units (UE's)) and occasionally active UE's with necessary signaling. The data network is provided through (small area) data cells (D-cells). These D-cells are only active when they need to be active, i.e. in case one or more mobile terminals (UE's) within the coverage of the particular D-cell have data to send or receive. Otherwise, the particular D-cell is switched off.

The advantages of this concept are evident, e.g. in terms of energy consumption. As may be appreciated, energy is saved in various ways. Firstly because only those D-cells are active that need to be active at a particular moment in time. Secondly, because the distance between the transmitter and receiver of the wireless signal within the D-cell (i.e. between the base station which controls the D-cell and the UE) is shorter. This latter allows to achieve a same data rate at lower signal powers, or can be used to the benefit of increasing the data rate: using a same or similar signal power to obtain higher data rates. More in general, the advantage of the BCG2 network architecture is thus at least two-fold. The network is most efficient in energy consumption—as well for the network entities themselves as for the mobile terminals (UE's). Moreover, the small sized D-cells allow for higher data rates where and when desired.

To allow communication, system information on the S-cell and the D-cells needs to be available to the UE's when needed. For providing S-cell system information in a BCG2 network, e.g. allowing idle terminals to move from one local area/routing area (LA/RA) to another LA/RA, a similar solution may be implemented as is used in legacy networks such as long term evolution (LTE) type networks using e.g. master information blocks (MIB) and system information blocks (SIB). However, the D-cells are only active when needed, and therefore the legacy solution of providing system information might not be used for the D-cells.

SUMMARY OF THE INVENTION

The term 'cell' used in this document is intended to refer to a geographic coverage area served by a transceiver station, enabling wireless data signal exchange between one or more mobile terminals (user equipment units (UE's)) in that coverage area and network entities of a backbone network within a cellular telecommunications system. The term 'backbone network' refers to the network infrastructure that interconnects the access points of the cellular network and effectively enables communication. The backbone network may be interconnected with one or more external networks of any type to enable mutual access to network resources and intercommunication between the backbone network and such external networks. The term 'access network' refers to the whole of access points, including the equipment making up the access points. An 'access point' is a local collection and distribution point of incoming and outgoing data communication traffic at the edge of a backbone network—in a cellular network the access points are formed by cells. A transceiver station of a cell usually consists of a communication aerial, e.g. an antenna, a communicative connection with a backbone network, and network equipment for enabling exchange of communication signals between the backbone network and mobile terminals within its associated cell. The present disclosure discriminates between signaling cells (S-cells) and data cells (D-cells) as briefly explained above.

It is an object of the present invention to overcome the disadvantages discussed in relation to the prior art, and to provide a reliable and energy efficient method of providing system information to active state user equipment units (active UE's) within a beyond cellular green generation (BCG2) type telecommunications network.

To this end, in accordance with a first aspect, there is provided herewith a method of distributing system information to one or more mobile terminals in a cellular telecommunications network, the network comprising at least one signaling cell serving a first coverage area, and one or more data cells associated with said signaling cell, each one of said data cells serving a respective partial coverage area covering at least a part of the first coverage area; wherein, for each one of said data cells, said respective data cell is operated in either an active or inactive communication mode depending on whether there is at least one of said mobile terminals present in the partial coverage area of said respective data cell, and whether said at least one mobile terminal operates in an active terminal mode; wherein for distributing of the system information for the data cells, the method comprises: said signaling cell transmitting a common indicator channel and one or more system information blocks, the common indicator channel including one or more pointers to said one or more system information blocks, and each one of said system information blocks including system information for at least one of said active data cells.

The common indicator channel of the present invention comprises pointers to the system information blocks for the data cells. These system information blocks are also provided by the signaling cell. The common indicator channel may therefore be considered a routing table for designating to the active mobile terminals where the system information resource blocks can be found. Preferably, the system information blocks are transmitted after transmission of the common indicator channel, however, this is not a requirement because optionally the system information may be stored or kept temporarily by the mobile terminal until system information may be received via the indicated system information block for the respective data cell during a next period. Such a period may for example be a frame, a subframe, or a transmission time interval (TTI) in an orthogonal frequency-division multiple access (ODFMA) scheme applied in an access network wherein the method of the present invention is applied.

An advantage of the use of the common indicator channel in combination with the system information blocks, is that the use of it conserves energy at the side of the mobile terminals. The terminals (UEs) only need to monitor the common indicator channel and subsequently 'tune in' on the system information block for their respective data cell, i.e. the active data cell that serves the area wherein the respective terminal is located. This prevents the terminal from having to listen to the system information for other data cells. In an energy efficient cellular type network such as a BCG2 network, the number of data cells within the coverage area of a signaling cell can be large (tens, hundreds) and therefore the effect of the invention on energy efficiency of the terminal is large. This energy can be utilized for example to obtain higher transmission data rates, or to enhance the up-time of the terminals before their batteries are empty.

Further advantage is achieved by enabling the possibility to use the same system information for different data cells. In that case, pointers associated with such data cells may simply designate a same system information block, or as described herein the group system information block. Terminals in these data cells automatically obtain the commonly identical system information. This saves energy and resources on the side of the signaling cell.

Even more sophisticated embodiments are possible, for example in case only a part of the system information for such data cells would be identical while other parts would be unique for each data cell. In that case, the common indicator channel for these data cells may designate the group system information block. The group system information block comprising the common system information, may additionally include a pointer to unique system information resources for each data cell or a pointer to a further specific indicator channel. The solution of the present invention may thus be tailored to many different situations.

Therefore, in accordance with an embodiment, at least part or all of system information data to be sent via said system information blocks is identical for a plurality of said data cells, i.e. a group of data cells, wherein said step of transmitting comprises transmitting a group system information block including said identical common system information data for the plurality of data cells.

In accordance with yet another embodiment, prior to said transmitting the method comprises: determining, by said signaling cell, a number of system information blocks required to be transmitted, and assigning, by said signaling cell, transmission capacity for transmitting the common indicator channel, wherein the transmission capacity is dynamically assigned in size dependent on said number of system information blocks determined. This enables the common indicator channel to be dynamic in size, dependent on the number of active data cells. If no data cells are active in the whole first coverage area of the signaling cell, then the size of the common indicator channel will be zero, i.e. no common indicator channels may be present. If, however, there are for example n data cells active, then the size will be at least large enough to contain the pointers to the system information blocks of these n data cells (wherein further some data cells could share the same system information in a group system information block: thus there may be less than n pointers for the n data cells).

According to an embodiment, communication between the network and the one or more mobile terminals is performed via an orthogonal frequency-division multiple access scheme, and the step of assigning transmission capacity is performed by at least one of a group comprising: assigning one or more time slots and/or assigning one or more frequency blocks to said common indicator channel. Capacity may be assigned by assigning a sub-carrier and a time slot, thereby assigning a position in a time frequency domain. This enables to assign a block of positions in the time-frequency domain for the common indicator channel. The size of this block is determined based on the number of system information blocks to be required.

In another embodiment of the method of the invention, the step of determining the number of system information blocks required to be transmitted includes at least one of a group comprising: determining the number and/or identity of associated data cells operating in said active communication mode; determining the number and/or identity of associated data cells that will be activated to operate in said active communication mode; determining the number and/or identity of associated data cells for which at least part or all of system information data to be sent via said system information blocks is identical. In particular, in case the number and/or identity of associated data cells that will be activated to operate is to be determined, in accordance with another embodiment the method comprises determining the data cells that will be activated based on at least one of a group comprising: transmission requests from said one or more mobile terminals, hand-over requests from said one or more terminals, and paging requests for said one or more mobile terminals. Any of such requests may 'awake' or activate a temporarily inactive data cell to be switched into an active communication mode.

The data cell identifiers of active data cells may of course be sent directly and unscrambled within the common indicator channel. However, in another embodiment, the pointers in the common indicator channel include data cell identifiers for associating the pointers with said data cells, and the data cell identifiers are scrambled using a system information radio network temporary identifier (SI-RNTI). Such scrambling may be performed by performing an exclusive-or operation on the data cell identifiers and the SI-RNTI, although the invention is not limited to such an implementation of the scrambling.

In a second aspect of the invention, there is provided a transceiver station arranged for performing the method of the first aspect. This may for example be a transceiver station for communicating with one or more mobile terminals in an access network of a cellular communications network, the transceiver station including network equipment suitable for providing a signaling cell serving a first coverage area, wherein said network equipment is further arranged for distributing system information for one or more data cells associated with said signaling cell, wherein each one of said data cells is operable for serving a respective partial coverage area covering at least a part of the first coverage area;

wherein each one of said data cells is operable in either an active or inactive communication mode dependent on whether there is at least one of said mobile terminals present in said partial coverage area of said respective data cell, and whether said at least one mobile terminal operates in an active terminal mode; wherein the network equipment is arranged for enabling the transceiver station to transmit a common indicator channel and one or more system information blocks, wherein the common indicator channel includes one or more pointers to said one or more system information blocks, and wherein each one of said system information blocks includes system information for at least one of said active data cells.

In accordance with a third aspect, there is provided a mobile terminal unit arranged for performing a method in accordance with the first aspect, or for cooperating with a transceiver station according to the second aspect, wherein the mobile terminal comprises a processing unit arranged for receiving a common indicator channel and for obtaining a pointer to a system information block from said common indicator channel, wherein said processing unit is further arranged for receiving a system information block indicated by said pointer, and for obtaining system information data therefrom for enabling data communication with a data cell.

The invention, in accordance with a fourth aspect thereof, relates to a computer program comprising instruction that, when loaded in a computer, enable the computer to perform a method according to the first aspect.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
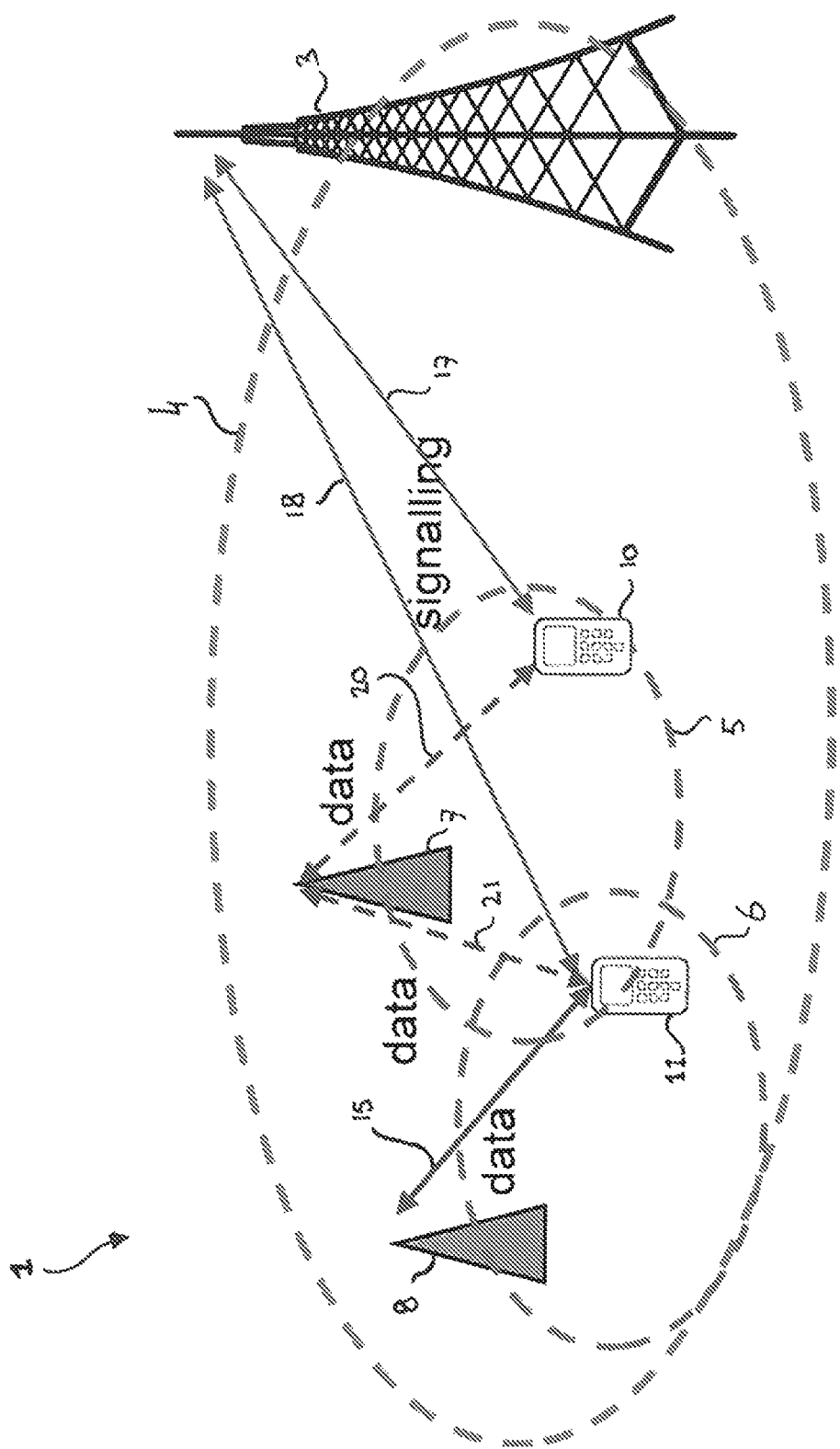
FIG. 1 schematically illustrates the principles of an energy efficient cellular network.

FIG. 1 schematically illustrates an access network 1 in a beyond cellular green generation (BCG2) type network. The BCG2 network is a design of an energy efficient cellular wireless network as being recently developed in a field of mobile communication. The access network 1 consists of various transceiver stations providing signaling cells, of which in FIG. 1 only one signaling cell transceiver station 3 is shown to enable explaining the principles of operation. In reality, the BCG2 network may comprise many access points such as the one illustrated in FIG. 1.

The transceiver station 3 typically serves a coverage area 4. The area 4 will hereinafter be referred to as the S-cell 4. The term 'S-cell' refers to a signaling cell and indicates the main functionality of the S-cell 4. For example, the S-cell 4 may exchange signaling messages with mobile terminals 10 and 11 in the network.

A further type of cells is provided by the data cells or D-cells, such as data cells 5 and 6, that are served by the transceiver stations 7 and 8 respectively. The data cells 5 and 6 are typically much smaller than the S-cell 4, and the coverage area of a typical data cell 5 covers only a part of the coverage area 4 of the S-cell. The data cells 5 and 6 enable data communication with the mobile terminals 10 and 11, i.e. exchanging the actual payload data to be conveyed across the network. Ideally every location within the coverage area 4 of the S-cell will be associated with at least one data cell (such as data cells 5 and 6) to allow the provisioning of network services across all of the S-cell. As may be appreciated, in rural areas or in remote areas with only limited need for network services, the coverage area 4 of the S-cell may have gaps that are not associated with any data cell. Thus, it is not a requirement that all of the coverage area of the S-cell 4 will be associated with some data cell; this depends on the situation as the skilled person may appreciate. For the present example, we assume that many data cells such as data cell 5 and 6 together cover the complete area of S-cell 4.

In case a mobile terminal 11 operates in an active terminal mode, i.e. actively performing data communication, a data connection 15 exists between the mobile terminal 11 and the transceiver 8 of the associated data cell 6. The use of data cells for short distance data communication enables to reduce transmission power between the sender and the receiver and/or to use the applied transmission power more efficiently for obtaining a higher data rate. As may be appreciated this provides advantageous flexibility in terms of energy usage and network performance.

While terminals, such as mobile terminal 11, actively exchange data with a data cell, such as data cell 6, such terminals operate in active terminal mode. However, in case no data communication of any kind is required, the terminals such as mobile terminal 10, switch into idle terminal mode. In idle terminal mode, the terminals are not switched off, but do not need to send or receive data at that moment through the network. For energy efficiency, no connection with any data cell within the S-cell 4 is maintained by such an idle terminal, e.g. terminal 10. However, some occasional exchange of signaling messages between an idle mobile terminal 10 and a transceiver 3 of the S-cell 4 may be performed. This is for example the case when the idle mobile terminal 10 detaches from the network, or when the idle mobile terminal 10 travels to a different S-cell, thereby having to notify the respective transceiver station of the new S-cell. Therefore, a signaling connection 17 between terminal 10 and S-cell 4 will be maintained; and idle terminals are therefore said to 'camp' on S-cell 4.

As will be explained further below, with reference to FIG. 2, data cells in a BCG2 type network are only operated in an active communication mode in case there is at least one mobile terminal present in the coverage area of the respective data cell, which operates in active terminal mode and is not served by other data cells. Therefore, in cases wherein only idle mobile terminals 10 are present in the coverage area 5 of a data cell, the data cell 5 is operated in an inactive communication mode to save energy. In FIG. 1, since clearly mobile terminal 11 maintains a data connection 15 with transceiver 8 of data cell 6, data cell 6 is operated in active communication mode.

In cases wherein an idle mobile terminal 10 requires to set up a data connection (e.g. for performing data communication on its initiative or in response to a paging request), the corresponding data cell 5 will switch from the inactive communication mode into the active communication mode for setting up the data connection 20 with the mobile terminal 10. In FIG. 1, the data connection 20 is illustrated as a dashed line to illustrate that it is a new data connection to be set up with the transceiver 7 of the yet inactive data cell 5. A similar situation exists when for example mobile terminal 11, which does have an active data connection 15 with the transceiver station 8, travels to a new data cell, e.g. data cell 5. In this case, a handover procedure is required for setting up a new data connection 21 with transceiver 7 of a data cell 5. Therefore, also in case of such a handover, the inactive data cell 5 has to be switched into the active communication mode to enable the data connection 21.

The above signaling between the S-cell 4 and the mobile terminals 10 and 11 is schematically indicated in FIG. 1 with signaling connections 17 and 18. This, however, does not prevent any occasional signaling from being performed directly between active mobile terminals, such as mobile terminal 11, and their associated data cells 6 via the data connection 15, where this may be advantageous or necessary.

Figure 2:
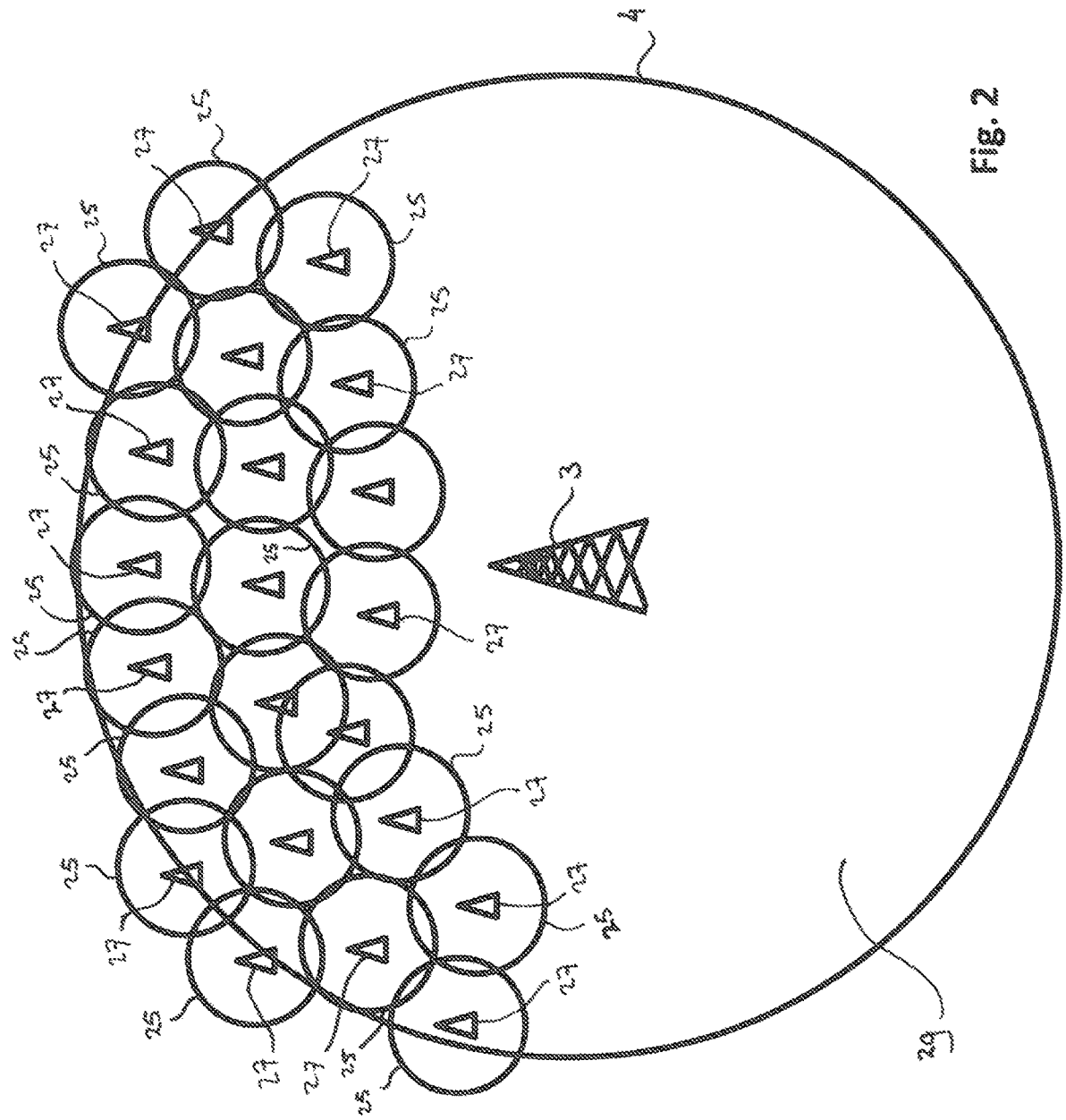
FIG. 2 schematically illustrates a signaling cell and data cells wherein the method of the present invention may be applied.

The principles of covering the coverage area 29 of an S-cell 4 with smaller data cells 25 is schematically illustrated in FIG. 2. In FIG. 2, only part of the total area of the S-cell 4 is illustrated as being covered by data cells 25. This, however, has only been illustrated in this manner for the sake of clarity, and in principle all of the coverage area 29 of the S-cell 4 may be covered with data cells 25 to enable data communication everywhere in the S-cell 4. Each of the data cells 25 has an associated transceiver station 27 facilitating the data communication within the data cell (or D-cell) 25. The same figure has been illustrated in FIG. 3, however in FIG. 3 a distinguishment is made between data cells operating in inactive communication mode (the D-cells 25i), and data cells that are operated in the active communication mode (e.g. D-cells 25a-1, 25a-2 and 25a-3). Only the data cells wherein at least one mobile terminal is operating in the active terminal mode, thereby requiring a data connection with the D-cell, are operated in the active communication mode; these are D-cells 25a-1, 25a-2 and 25a-3.

Figure 3:
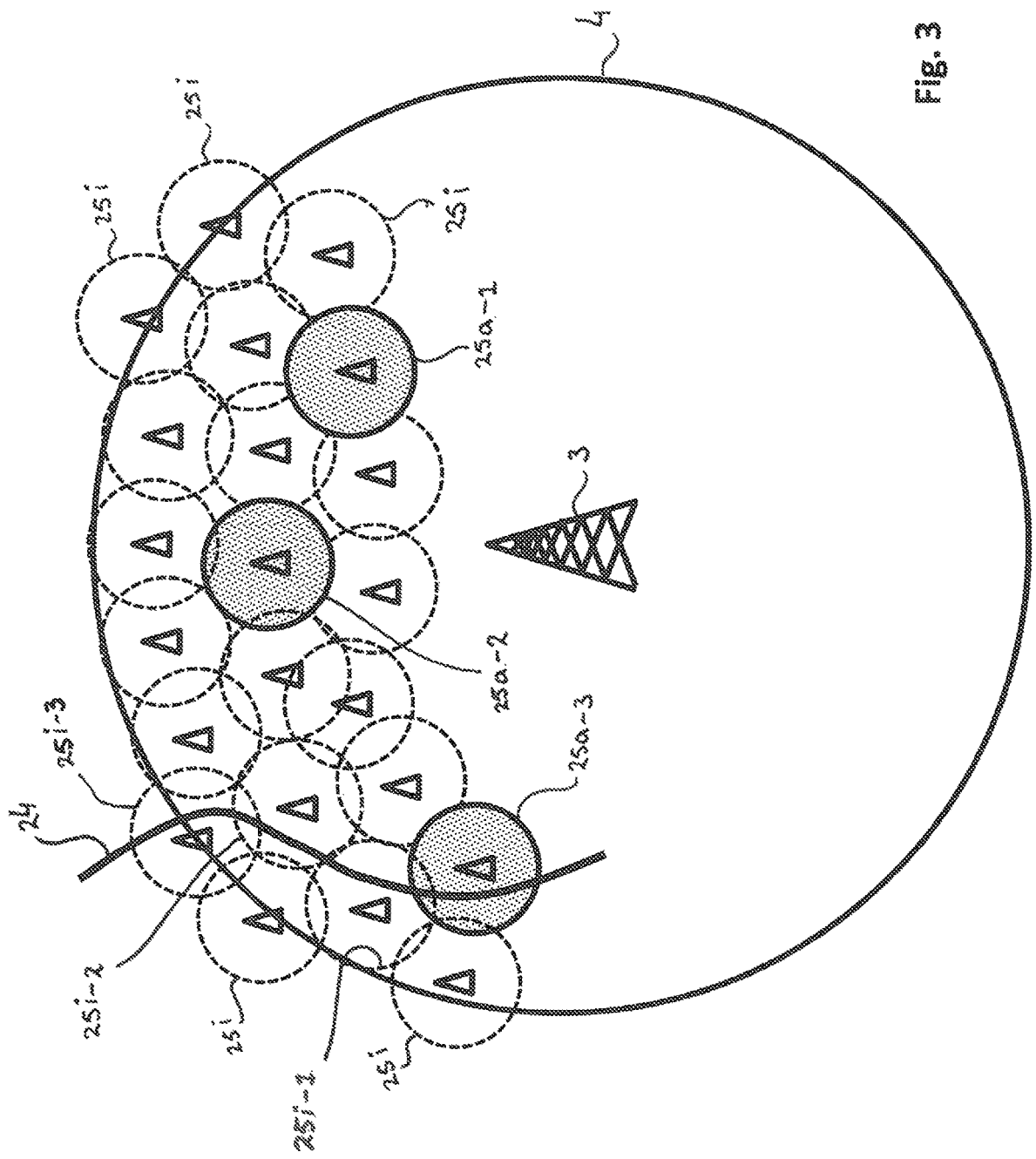
FIG. 3 schematically illustrates the principles of active and inactive data cells.

In FIG. 3, a mobile terminal that is presently active in D-cell 25a-3, travels along the path schematically indicated by reference numeral 24. Underway, a handover to various subsequent data cells is required, namely in subsequent order: data cell 25i-1, data cell 25i-2 and data cell 25i-3. Upon handover, the subsequent cell (e.g. 25i-1) will be switched into the active communication mode and a data connection with the terminal will be set up. Once this has been established, the data connection with the previous data cell (e.g. 25a-3) will be released. In case the mobile terminal was the last active mobile terminal present within the coverage area of the previous data cell 25a-3, then this previous data cell 25a-3 will be switched into the inactive communication mode to save energy.

To enable the maintenance and establishing of data connections with transceiver stations of data cells, it is required to exchange system information for these data cells with the respective mobile terminals. System information specifies the properties and necessary information required to set up and maintain the data connection with the specific cell, such as carrier or subcarrier frequencies, time slots, supported data rates, and any other relevant information. While an active data connection is present between a mobile terminal and a data cell, the exchange of such system information may in principle be performed via the active data connection, e.g. for the next number of time slots. This will, however, be more difficult for data cells that are presently being operated in the inactive communication mode. In this case, the data cells need to be switched in the active mode first, and somehow present their system information to the mobile terminals that require this. The awakening of the data cell itself, and the procedure to be followed to exchange the system information and establish the data connection may cause unwanted delays and for example result in loss of connection during handover. The provisioning of system information may therefore, for example, be performed via the S-cell 4, e.g. via signaling connections 17 and 18 illustrated in FIG. 1. However, because the number of data cells that are present in an S-cell may be large, the amount of signaling information to be exchanged with the mobile terminals present within the S-cell may be large. Moreover, because the coverage area of the S-cell 4 is much larger than the coverage area of the D-cells 25, the transmission power for transmitting the system information for all the D-cells within the S-cell 4 must also be large. For this reason, providing system information via S-cell 4 cannot be performed in an energy efficient manner. Moreover, and maybe more important, this system information provided via the S-cell 4, needs to be interpreted by the mobile terminals receiving it, in order to allow these mobile terminals to identify and receive the system information for their associated data cell for setting up a data connection. Therefore also on the side of the mobile terminal, the exchange of system information in this manner involves a large amount of energy consumption, thereby draining the batteries of the mobile terminals in active mode.

Figure 4:
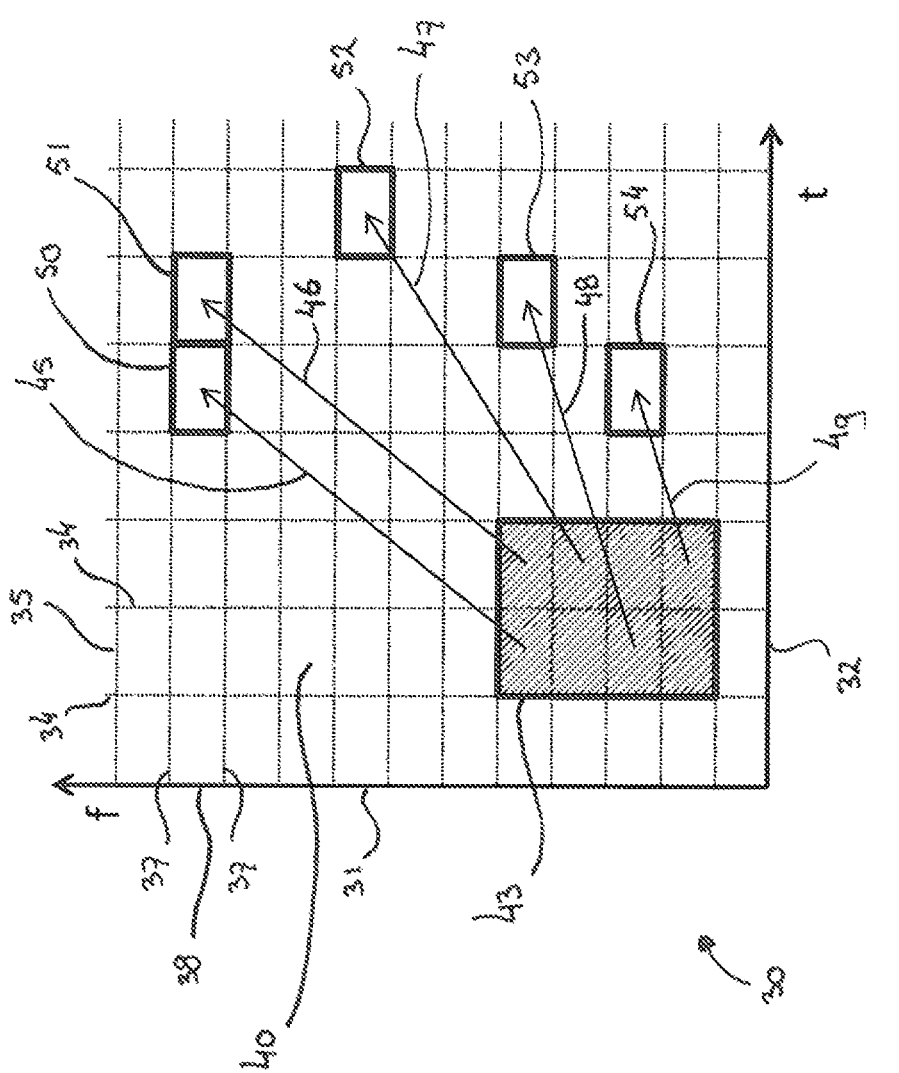
FIG. 4 schematically illustrates an embodiment of the present invention applied to an OFDMA scheme.

FIG. 4 schematically illustrates the provisioning of system information for D-cells or data cells in accordance with the present invention via an orthogonal frequency division multiple access (OFDMA) scheme through the S-cells 4. FIG. 4 illustrates a time-frequency domain 30, illustrating on the vertical axis 31 the frequency range f, while illustrating on the horizontal axis 32 the time t.

The frequency domain is divided into a plurality of frequency channels around carrier frequencies. For example, in the frequency domain, dotted lines 37 define a frequency channel around a carrier frequency 38. The carrier domain is usually divided into a plurality of orthogonal subcarriers, allowing data to be sent for each carrier frequency simultaneously across a plurality of subcarrier frequencies. In the time domain, a division as indicated by dotted lines 34 is made for defining time slots 35. Therefore, in the time frequency domain, the carriers, subcarriers, and time slots define the resource blocks, such as resource block 40, that can be used for conveying data between the S-cell and the mobile terminals.

In accordance with the principles of the present invention, the S-cell 4 transmits a common indicator channel 43. In the present disclosure, the common indicator channel 43 will also be referred to as the broadcast indicator channel (BICH), although this is merely a name that may be changed by the skilled person if desired. The BICH 43 conveys a plurality of pointers 45, 46, 47, 48, and 49 to resource blocks in the time frequency domain 30. The broadcast indicator channel 43 is at least to be received by all active mobile terminals present in the coverage area of the S-cell 4. The broadcast indicated channel (BICH) also needs to be received by the mobile terminals that are currently in the process of setting up a data connection, i.e. that are being switched from the idle terminal mode to the active terminal mode. These to-be-active mobile terminals may for example include mobile terminals that respond to a paging request, or which themselves initiate a request for setting up a data connection. An example of an active mobile terminal, i.e. a mobile terminal that is operated in the active terminal mode, is mobile terminal 11 in FIG. 1. An example of a to-be-active mobile terminal, i.e. a mobile terminal that is to be switched from the idle terminal mode into the active terminal mode, is for example mobile terminal 10 in FIG. 1.

Back in FIG. 4, the pointers 45, 46, 47, 48, and 49 designate the resource blocks 50, 51, 52, 53 and 54 respectively. The resource blocks 50-54 contain system information for specific data cells, and are further to be referred to as system information blocks 50-54. A mobile terminal that receives the BICH 43, interprets the BICH 43 and retrieves the pointer (e.g. pointer 47) to the system information block 52 that is relevant for the data cell wherein this mobile terminal is operating. For example, mobile terminal 11 interprets the BICH 43, and uses the pointer 47 which indicates the system information block 52 containing system information data for data cell 5 of FIG. 1.

As may be appreciated, the mobile terminals only need to interpret the BICH to retrieve the pointer to the system information block which is relevant for their intended data cell. Therefore, there is no need for these mobile terminals to retrieve all the signaling information including all the system information of all active data cells. Once the pointer is retrieved from the BICH 43, the mobile terminals focus on the designated resource block (e.g. system information block 52) to retrieve the system information data for their data cell.

Moreover, also the size of the BICH 43 is dynamically set by the S-cell network equipment. The S-cell first determines the number of active data cells in its coverage area 4, and optionally also the number of data cells that are becoming active in response to data requests from mobile terminals. Based on this information, the number of pointers to be included in the BICH 43 is known to the S-cell, and the S-cell makes a capacity reservation within its OFDMA domain providing a suitable data size. Therefore, the BICH is a dynamic channel enabling efficient energy usage at the S-cell 4. In addition to counting the number of active data cells and soon to be active data cells, some of the data cells that are active within the coverage area of the S-cell 4, may use identical system information to enable data communication therewith. This may for example be understood by realizing that the coverage area of the data cells within each S-cell will for most data cells not overlap (except, maybe, for contiguous data cells). The non overlapping data cells may of course use identical system information without interfering with each other. Therefore, in addition to simply counting the number of active data cells and the number of cells that become active, the size of the BICH 43 may further be determined based on the number of data cells for which the system information data will be (at least partly) identical.

Figure 5:
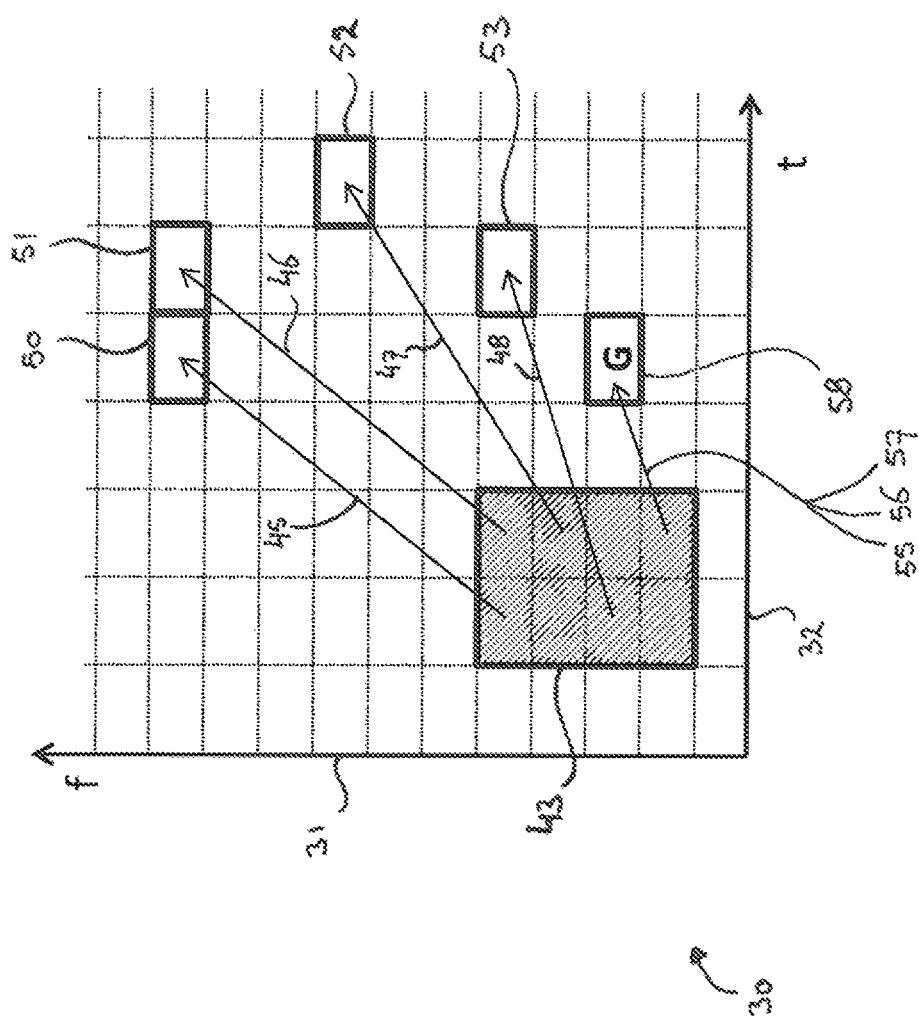
FIG. 5 schematically illustrates a further embodiment of the present invention applied in a OFDMA scheme.

An example of an embodiment of the present invention is illustrated in FIG. 5, wherein for some of the data cells within the S-cell 4, the system information is identical. In this case, instead of reserving a system information block for each data cell, the S-cell may reserve a group system information block 58 containing relevant system information data for a plurality of data cells. The pointers 55, 56 and 57 of these data cells all indicate the same system information block 58. Alternatively, a single pointer may be associated with a plurality of data cell identifiers (D-cell, ID's). As a further alternative, not illustrated in FIG. 5 or any of the other figures, only part of the system information for these data cells is identical, and the group system information block 58 may refer to subsequent specific information blocks for each data cell, or to a further indicator channel for these group data cells.

Figure 6:
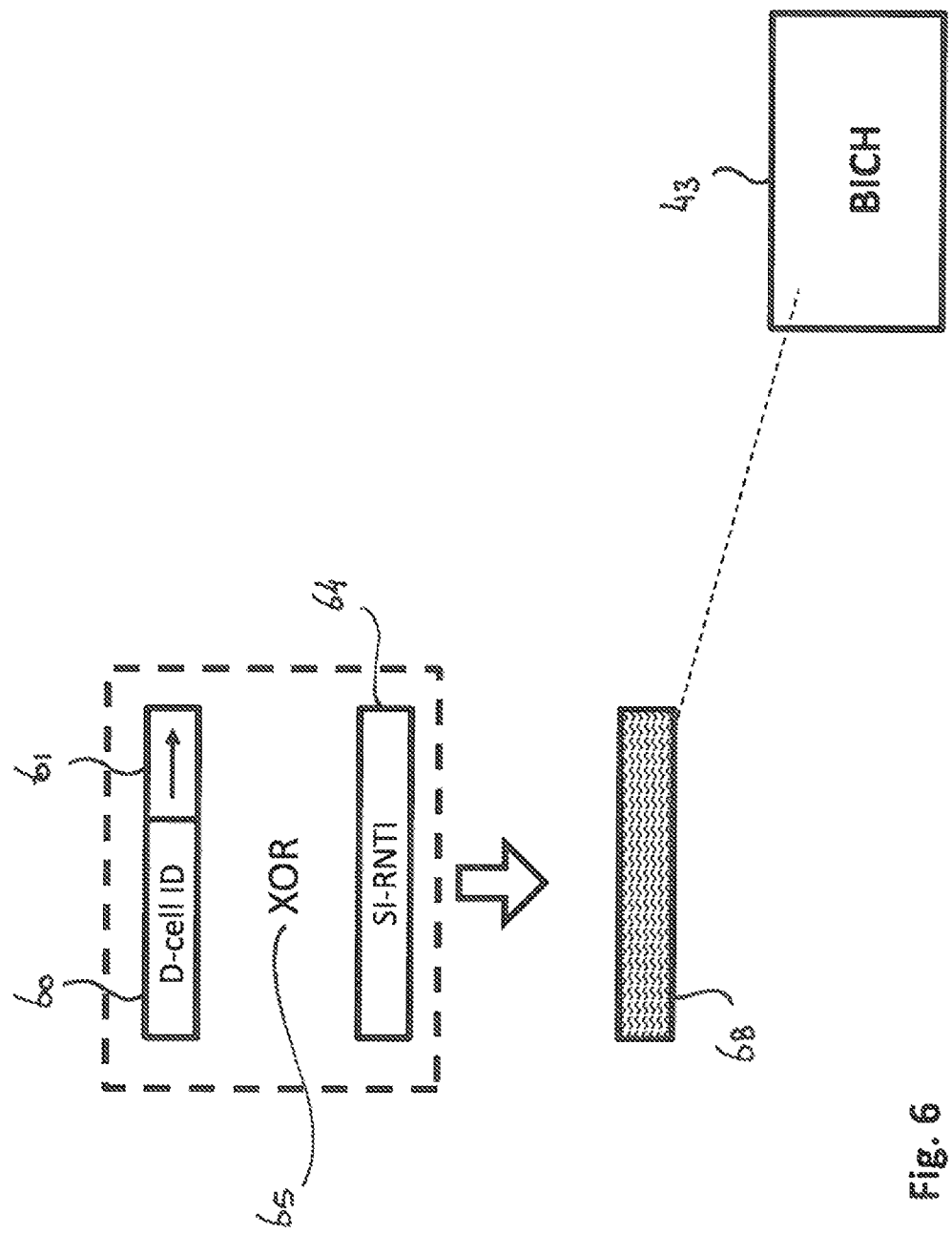
FIG. 6 schematically illustrates an example of the scrambling of information in an embodiment of the present invention.

FIG. 6 schematically illustrates an optional scrambling of a data cell identifier information and pointer information in the BICH 43. In FIG. 6, a data cell identifier 60 is associated with a pointer 61. The pointer 61 designates a system information block to be send by the S-cell for the data cell corresponding with the D-cell ID 60. In the BICH 43, this information may be scrambled using a system information radio network temporary identifier (SI-RNTI) 64. The scrambling may be done in any desired way, however a suitable manner of scrambling may be to perform an exclusive-or 65 on the SI-RNTI and the D-cell ID/pointer, as indicated in FIG. 6. This provides the scrambled information 68 which is included in the BICH and can be interpreted by the mobile terminals of that data cell.

Figure 7:
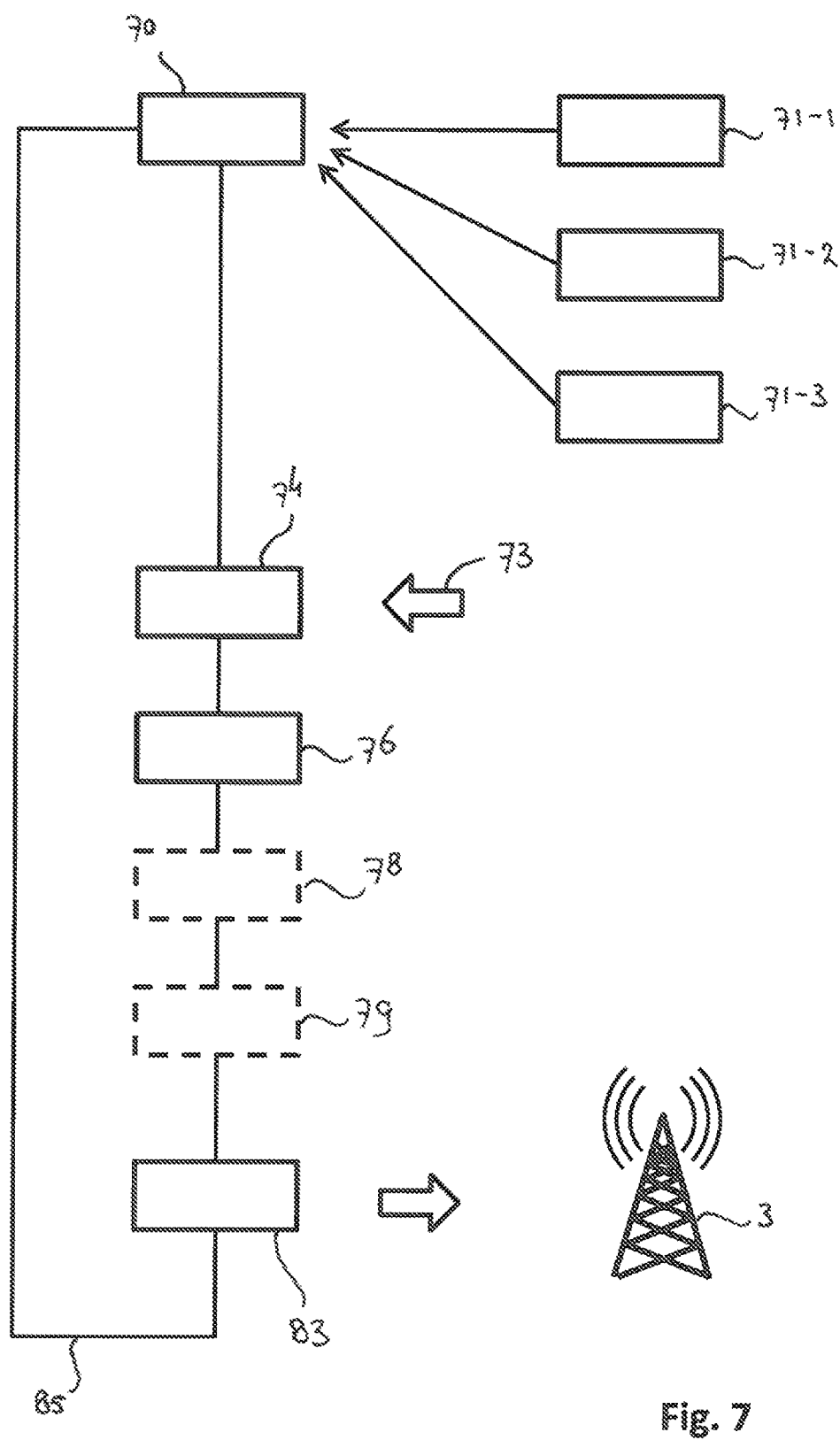
FIG. 7 schematically illustrates the method of the present invention.

FIG. 7 schematically illustrates a method of the present invention. The method starts with the S-cell determining the size of the BICH in step 70. Determining the size of the BICH may be based on a step 71-1 of determining the number of active data cells (data cells operating in active communication mode), on a step 71-2 of determining the number of data cells that will become active e.g. by inventorizing for which data cells a connection setup request has been received based on paging requests or communication requests, or on a step 71-3 of determining the amount of data cells for which the system information may be identical. Altogether, this provides an indication to the S-cell of the number of pointers and information to be included in the BICH 43. Next, in step 74, the S-cell generates the information to be sent in the system information box, for example based on input 73 received from other network entities or from the data cells itself. Then in step 76, the BICH is generated by the S-cell, including the pointers to the system information blocks. As may be appreciated, the sequence order of the method steps 74 and 76 may easily be switched, or they may be performed simultaneously. Once the BICH is generated, and the contents of the system information blocks is available to the S-cell 4, the BICH and subsequently the system information blocks will be transmitted in step 83 to the mobile terminals via the transceiver 3 associated with the S-cell. Since the method is periodically being repeated, after transmitting the information, the method returns back to step 70 as indicated by 85.

In addition to the above mentioned steps, optionally the method of the present invention may include a step of optimizing the transmission power for each of the system information blocks in step 78. For example, an algorithm may be used that calculates the sufficient amount of transmission power required to reach a specific data cell based on the distance between the data cell and the transceiver 3. Moreover, optionally in step 79 also the transmission power of the BICH may be optimized dependent on the specifics of the communication. These optional steps are indicated by the dashed boxes 78 and 79 in FIG. 7.

Figure 8:
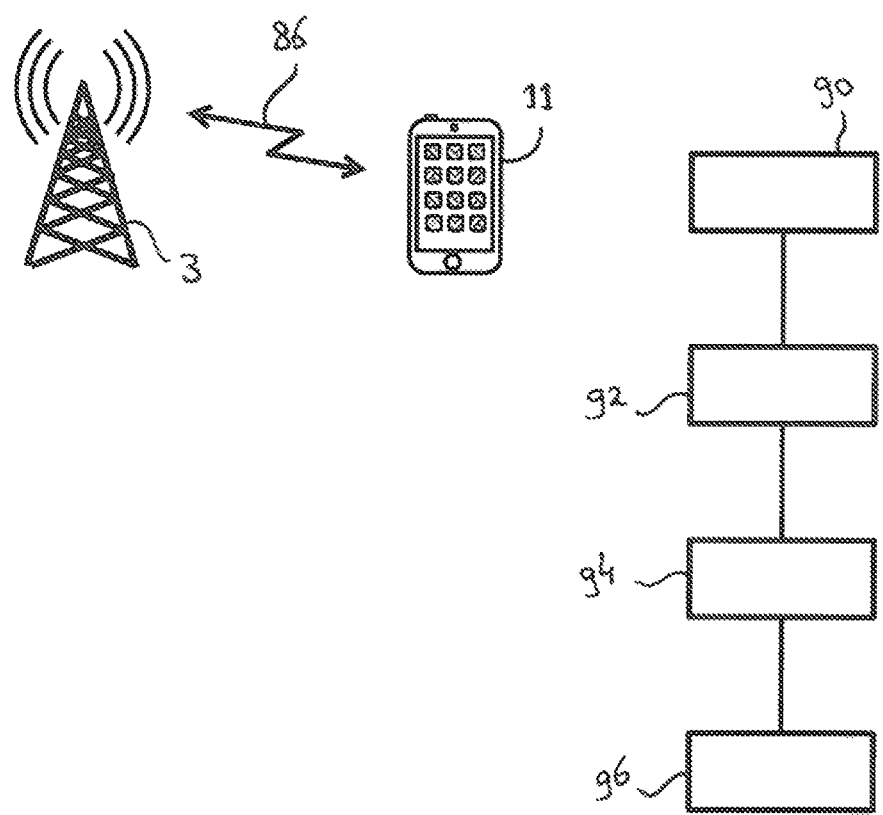
FIG. 8 schematically illustrates a method of receiving system information by a mobile terminal in accordance with the present invention.

FIG. 8 schematically illustrates how a mobile terminal 11 interprets and uses the BICH and system information blocks for establishing a connection with the data cells. In step 90, the mobile terminal 11 receives the BICH through the signaling data connection 86 between the transceiver 3 and the mobile terminal 11. Then, in step 92 the mobile terminal 11 recognizes the pointer to the relevant system information block, i.e. based on the (scrambled) D-cell ID.

In step 94, the system information block is received and interpreted by the mobile terminal, and the system information data is obtained. Then in step 96, the mobile terminal 11, where necessary, adapts tuning of the data connection dependent on the system information data received. In case the mobile terminal is an idle terminal that becomes active and requires to set up a data connection with a new data cell, instead of adapting the tuning, the mobile terminal commences tuning to the designated or dedicated channel to receive data from the transceiver of the data cell.

The present invention has been described in terms of some specific embodiments thereof. It will be appreciated that the embodiments shown in the drawings and described herein are intended for illustrated purposes only and are not by any manner or means intended to be restrictive on the invention. The context of the invention discussed here is merely restricted by the scope of the appended claims.

The invention claimed is:

1. A method of distributing system information to one or more mobile terminals in a cellular telecommunications network, the cellular telecommunications network comprising at least one first transceiver providing at least one signaling cell serving a first coverage area, wherein the signaling cell is operative to exchange a signaling message with the one or more mobile terminals, and cellular telecommunications network further comprising one or more second transceivers, each of the second transceivers providing a data cell such as to provide one or more data cells associated with the at least one signaling cell, wherein each one of the one or more data cells serves a respective partial coverage area covering at least a part of the first coverage area, and wherein the one or more data cells enable data communication with the one or more mobile terminals, the method comprising:
    switching each of the one or more data cells, by the second transceiver associated with the respective data cell, for operating said data cell in either an active communication mode or an inactive communication mode, wherein for performing the switching, the second transceiver determines:
        whether there is at least one mobile terminal of the one or more mobile terminals present in the partial coverage area of the data cell associated with the respective second transceiver and whether said at least one mobile terminal is operating in an active terminal mode; whether said at least one mobile terminal is not served by other data cells than the data cell associated with the respective second transceiver; and
    wherein the second transceiver performs the switching based on the determination;
    wherein the method further comprises;
    determining at least one of a number or identity of the data cells that are operated in or will be switched into the active communication mode; and
    transmitting, by the first transceiver of the at least one signaling cell, a common indicator channel and one or more system information blocks, the common indicator channel including one or more pointers to said one or more system information blocks, wherein a size of the common indicator channel is based on the determined number or identity of the data cells that are operated in or will be switched into the active communication mode, and wherein each one of said one or more system information blocks including system information for at least one of the one or more data cells that operates in the active communication mode.

2. The method according to claim 1, wherein prior to said transmitting the method further comprises:
    determining, by the first transceiver of the at least one signaling cell or by a further network entity, a number of system information blocks required to be transmitted, and
    assigning, by the first transceiver of the at least one signaling cell or by the further network entity, a transmission capacity for transmitting the common indicator channel, wherein the transmission capacity is dynamically assigned in size dependent on said number of system information blocks determined.

3. The method according to claim 2, wherein communication between the cellular telecommunications network and the one or more mobile terminals is performed via an orthogonal frequency-division multiple access scheme, and wherein said step of assigning the transmission capacity is performed by at least one of a group comprising: assigning one or more time slots and assigning one or more carrier frequencies to said common indicator channel.

4. The method according to claim 2, wherein the step of determining the number of system information blocks required to be transmitted includes at least one of a group comprising:
    determining, by the first transceiver or the further network entity, at least one of a number or an identity of the one or more data cells operating in said active communication mode;
    determining, by the first transceiver or the further network entity, at least one of a number or an identity of the one or more data cells that will be activated to operate in said active communication mode; and
    determining, by the first transceiver or the further network entity, at least one of a number or an identity of the one or more data cells for which at least part or all of system information data to be sent via said system information blocks is identical.

5. The method according to claim 4, including said step of determining, by the first transceiver or the further network entity, the number or the identity of the one or more data cells that will be activated to operate in said active communication mode, wherein the one or more data cells that will be activated are determined based on at least one of a group comprising: transmission requests from said one or more mobile terminals, hand-over requests from said one or more mobile terminals, and paging requests for said one or more mobile terminals.

6. The method according to claim 1, wherein the one or more data cells include at least two data cells, further comprising:
    determining, for a plurality of the data cells, that at least part or all of system information data to be sent via said system information blocks is identical, wherein said step of transmitting comprises transmitting a group system information block including common system information data that is identical for the plurality of the one or more data cells.

7. The method according to claim 1, further comprising:
    including, by the first transceiver in the one or more pointers in the common indicator channel, data cell identifiers for associating the one or more pointers with the one or more data cells, wherein the data cell identifiers are scrambled using a system information radio network temporary identifier—SI-RNTI—.

8. A transceiver station for communicating with one or more mobile terminals in an access network of a cellular communications network, the transceiver station comprising:
   network equipment configured for providing a signaling cell serving a first coverage area, wherein the signaling cell is operative to exchange a signaling message with the one or more mobile terminals;
   wherein said network equipment is further configured for distributing system information for one or more further transceivers providing one or more data cells associated with said signaling cell, wherein each of the one or more data cells is operable for serving a respective partial coverage area covering at least a part of the first coverage area, and wherein the one or more data cells enable data communication with the one or more mobile terminals, wherein each of the one or more data cells is switched by an associated further transceiver of the one or more further transceivers in either an active communication mode or an inactive communication mode, wherein operating in the active communication mode is applied by said associated further transceiver when there is at least one mobile terminal of the one or more mobile terminals being present in said partial coverage area of a respective data cell of the one or more data cells and said at least one mobile terminal is operating in an active terminal mode and is not served by other data cells of the one or more data cells than the data cell associated with the respective further transceiver, or when a connection setup request has been received for the respective data cell associated with the respective further transceiver, and wherein otherwise operating in the inactive communication mode is applied by said associated further transceiver;
   wherein the network equipment is configured for enabling the transceiver station to:
   determine at least one of a number or identity of the data cells that are operated in the active communication mode or that will be switched into the active communication mode; and
   transmit a common indicator channel and one or more system information blocks, wherein the common indicator channel includes one or more pointers to said one or more system information blocks, wherein a size of the common indicator channel is based on the determined number or identity of the data cells that are operated in or will be switched into the active communication mode, and wherein each one of said system information blocks includes system information for at least one of the one or more data cells that operates in the active communication mode.

9. The transceiver station according to claim 8, wherein the network equipment further comprises a controller configured for determining a number of system information blocks required to be transmitted for the one or more data cells of said signaling cell, and for dynamically assigning a transmission capacity for transmitting the common indicator channel, the transmission capacity in size being dependent on the number of system information blocks as determined by the controller.

10. The transceiver station according to claim 9, configured for applying an orthogonal frequency-division multiple access scheme for enabling communication with the one or more mobile terminals, wherein for said dynamic assigning of the transmission capacity the controller is configured for at least one of a group comprising: assigning one or more time slots and assigning one or more carrier frequencies to said common indicator channel.

11. The transceiver station according to claim 9, wherein for determining the number of system information blocks required to be transmitted, the controller is configured for at least one of a group comprising:
   determining at least one of a number or an identity of the one or more data cells operating in said active communication mode;
   determining at least one of a number or an identity of the one or more data cells that will be activated to operate in said active communication mode; and
   determining at least one of a number or an identity of the one or more data cells for which at least part or all of system information data to be sent via said system information blocks is identical.

12. The transceiver station according to claim 8, wherein for a plurality of said data cells at least part or all of system information data to be sent via said system information blocks is identical, wherein the network equipment is configured for enabling the transceiver station to transmit a group system information block including common system information data that is identical for the plurality of data cells.

13. The transceiver station according to claim 8, wherein the controller is configured for scrambling data cell identifiers included in the pointers in the common indicator channel, wherein for performing the scrambling, the controller is configured for performing an exclusive-or operation of the data cell identifiers with a system information radio network temporary identifier—SI-RNTI—.

14. The transceiver station according to claim 8, further comprising a mobile terminal unit, wherein the mobile terminal comprises a processing unit arranged for receiving a common indicator channel and for obtaining a pointer to a system information block from said common indicator channel, wherein said processing unit is further arranged for receiving a system information block indicated by said pointer, and for obtaining system information data therefrom for enabling data communication with a data cell.

15. A computer program product for distributing system information to one or more mobile terminals in a cellular telecommunications network, the cellular telecommunications network comprising at least one first transceiver providing at least one signaling cell serving a first coverage area, wherein the signaling cell is operative to exchange a signaling message with the one or more mobile terminals, and the cellular telecommunications network further comprising one or more second transceivers each providing a data cell such as to provide one or more data cells associated with the at least one signaling cell, each one of the one or more data cells serving a respective partial coverage area covering at least a part of the first coverage area, and wherein the one or more data cells enable data communication with the one or more mobile terminals,
   wherein each of the one or more data cells is switched, by the second transceiver associated with the respective data cell, in either an active communication mode or an inactive communication mode, wherein operating in the active communication mode is applied by the second transceiver when there is at least one mobile terminal of the one or more mobile terminals being present in said partial coverage area of a respective data cell of the one or more data cells and said at least one mobile terminal is operating in an active terminal mode and is not served by other data cells of the one or more data cells than the data cell associated with the respective second transceiver, or when a connection setup request has been received for the respective data cell associated with the respective further transceiver, and wherein otherwise the data cell is operated by the second transceiver in the inactive communication mode;

the computer program product comprising a non-transitory computer readable storage medium comprising instructions that, when loaded in a computer associated with the first transceiver, enable the first transceiver to perform a method comprising:

determining at least one of a number or identity of the data cells that are operated in or will be switched into the active communication mode; and transmitting, within the at least one signaling cell, a common indicator channel and one or more system information blocks, the common indicator channel including one or more pointers to said one or more system information blocks, wherein a size of the common indicator channel is based on the determined number or identity of the data cells that are operated in or will be switched into the active communication mode, and wherein each one of said system information blocks including system information for at least one of the one or more data cells that is operated in the active communication mode.

16. The computer program product according to claim 15, wherein prior to said transmitting the method comprises:

determining, by the first transceiver of the at least one signaling cell or by a further network entity, a number of system information blocks required to be transmitted, and assigning, by the at least one signaling cell or by the further network entity, a transmission capacity for transmitting the common indicator channel, wherein the transmission capacity is dynamically assigned in size dependent on said number of system information blocks determined.

17. The computer program product according to claim 16, wherein communication between the cellular telecommunications network and the one or more mobile terminals is performed via an orthogonal frequency-division multiple access scheme, and wherein said step of assigning the transmission capacity is performed by at least one of a group comprising: assigning one or more time slots and assigning one or more carrier frequencies to said common indicator channel.

18. The computer program product according to claim 16, wherein the step of determining the number of system information blocks required to be transmitted includes at least one of a group comprising:

determining at least one of a number or an identity of the one or more data cells operating in said active communication mode;

determining at least one of a number or an identity of the one or more data cells that will be activated to operate in said active communication mode; and determining at least one of a number or an identity of the one or more data cells for which at least part or all of system information data to be sent via said system information blocks is identical.

* * * * *

UNITED STATES PATENT AND TRADEMARK OFFICE
CERTIFICATE OF CORRECTION

PATENT NO. : 10,856,223 B2  
APPLICATION NO. : 15/324915  
DATED : December 1, 2020  
INVENTOR(S) : Zhang et al.

Page 1 of 1

It is certified that error appears in the above-identified patent and that said Letters Patent is hereby corrected as shown below:

On the Title Page

Item (72) Inventors should read:  
Haibin Zhang, The Hague (NL);  
Ljupco Jorguseski, The Hague (NL);  
Oliver Blume, Stuttgart (DE)

Signed and Sealed this  
Thirty-first Day of May, 2022

Katherine Kelly Vidal  
*Director of the United States Patent and Trademark Office*